United States Patent
Ward

(10) Patent No.: US 9,759,223 B2
(45) Date of Patent: Sep. 12, 2017

(54) BEARING SYSTEM FOR A TURBOCHARGER WITH AN INTERNAL ELECTRIC MOTOR

(71) Applicant: BorgWarner Inc., Auburn Hills, MI (US)

(72) Inventor: Daniel N. Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 320 days.

(21) Appl. No.: 14/397,511

(22) PCT Filed: Apr. 19, 2013

(86) PCT No.: PCT/US2013/037371
§ 371 (c)(1),
(2) Date: Oct. 28, 2014

(87) PCT Pub. No.: WO2013/165704
PCT Pub. Date: Nov. 7, 2013

(65) Prior Publication Data
US 2015/0125277 A1    May 7, 2015

Related U.S. Application Data

(60) Provisional application No. 61/640,354, filed on Apr. 30, 2012.

(51) Int. Cl.
*F04D 29/056*    (2006.01)
*F16C 17/02*    (2006.01)
(Continued)

(52) U.S. Cl.
CPC ............ *F04D 29/056* (2013.01); *F02B 37/10* (2013.01); *F02B 39/14* (2013.01); *F16C 17/02* (2013.01);
(Continued)

(58) Field of Classification Search
CPC ........ F02B 39/14; F02B 37/10; Y02T 10/144; F16C 17/02; F16C 17/26; F16C 35/02; F16C 33/04; F04D 29/056
See application file for complete search history.

(56) References Cited

U.S. PATENT DOCUMENTS 3,961,199 A * 6/1976 Bronicki ............... F02B 37/005
                                                                123/179.14
5,024,057 A * 6/1991 Kawamura ............... F02C 9/16
                                                                290/52
(Continued)

FOREIGN PATENT DOCUMENTS

CN        101776001 A    7/2010
KR    1020060040916 A    5/2006

OTHER PUBLICATIONS

International Application No. PCT/US2013/037371, International Search Report & Written Opinion, 12 pages, Jul. 25, 2013.
(Continued)

*Primary Examiner* — Igor Kershteyn
(74) *Attorney, Agent, or Firm* — Perkins Coie LLP

(57) ABSTRACT

A turbocharger bearing system comprising a shaft (211) including at least one shoulder (A2) with a rotor (212) disposed on the shaft (211). First and second bearing sleeves (254) are disposed on the shaft (211) at opposite ends of the rotor (212). Each bearing sleeve (254) includes a collar (213) and a journal portion (225). A journal bearing (249) is disposed on each journal portion (225) and the journal portion (225) of the first bearing sleeve (254) abuts the shoulder (A2) of the shaft (211). In certain aspects of the technology described herein, the bearing sleeves (254) may be oriented in opposite directions. The shaft (211) is the same diameter where the bearing sleeves (254) are positioned. Accordingly, the bearing sleeves (254) may be interchangeable, as well as the journal bearings (249).

15 Claims, 9 Drawing Sheets

(51) Int. Cl.
*F16C 33/04* (2006.01)
*F16C 35/02* (2006.01)
*F02B 39/14* (2006.01)
*F02B 37/10* (2006.01)
*F16C 17/26* (2006.01)

(52) U.S. Cl.
CPC .............. *F16C 17/26* (2013.01); *F16C 33/04* (2013.01); *F16C 35/02* (2013.01); *F05D 2220/40* (2013.01); *F16C 2360/24* (2013.01); *Y02T 10/144* (2013.01)

(56) References Cited

U.S. PATENT DOCUMENTS

| | | | |
|---|---|---|---|
| 5,074,115 A | | 12/1991 | Kawamura |
| 5,121,605 A | * | 6/1992 | Oda ........................ F01D 5/10 290/52 |
| 5,605,045 A | * | 2/1997 | Halimi ................... F01D 5/085 310/52 |
| 5,857,332 A | * | 1/1999 | Johnston ............... F01D 25/168 417/407 |
| 6,032,466 A | * | 3/2000 | Woollenweber ...... F01D 25/164 417/407 |
| 6,085,527 A | * | 7/2000 | Woollenweber ...... F02B 37/025 310/156.28 |
| 2009/0202343 A1 | | 8/2009 | McKeirnan, Jr. |
| 2010/0143104 A1 | | 6/2010 | Furman et al. |
| 2010/0284824 A1 | | 11/2010 | Hippen et al. |
| 2010/0308685 A1 | * | 12/2010 | Hippen ................ H02K 17/165 310/214 |

OTHER PUBLICATIONS

Chinese Patent Application No. 201380020990.9, Office Action, 19 pages, Mar. 3, 2016.

* cited by examiner

BEARING SYSTEM FOR A TURBOCHARGER WITH AN INTERNAL ELECTRIC MOTOR

BACKGROUND

Turbochargers are a type of forced induction system. Turbochargers deliver air, at greater density than would be possible in a normally aspirated configuration. The greater air density allows more fuel to be combusted, thus boosting the engine's horsepower without significantly increasing engine weight. A smaller turbocharged engine, replacing a normally aspirated engine of a larger physical size, will reduce the mass of the engine and can reduce the aerodynamic frontal area of the vehicle.

With reference to FIG. 1, turbochargers use the exhaust flow from the engine exhaust manifold to drive a turbine wheel 10. The energy extracted by the turbine wheel is translated to a rotating motion which then drives a compressor wheel 20. The compressor wheel draws air into the turbocharger, compresses the air, and delivers it to the intake side of the engine. The rotating assembly is supported by a bearing system. Some bearing systems consist of sleeve type hydrodynamic bearings and some consist of rolling element type bearings.

As the mass flow of exhaust to the turbocharger changes, the rotational speed changes (from 80,000 RPM for large turbochargers, to 250,000 RPM for smaller turbochargers). Some of the parameters affecting the time for the rotating assembly to change from one equilibrium condition to another equilibrium condition are, for example: the inertia of the rotating assembly, the friction losses in the bearing system, and the aerodynamic efficiency of the wheels.

Electrically assisted turbochargers can use power supplied by an external source or power generated directly by the engine. The challenges of fitting an electric motor into a turbocharger are not minor. Most electrically assisted systems have either a connection to the (relatively) cold compressor-end of the rotating assembly or are fitted between the wheels. For example, U.S. Pat. No. 6,845,617 teaches an electric motor fitted to the compressor-end of the turbocharger outboard of the bearing system.

In the example depicted in FIGS. 1 and 2, an electric motor is disposed between the journal bearings in a split turbocharger bearing housing. The bearing housing is split into an upper portion 89 with a flange 91 and a lower portion 90 with a flange 92. When the two flanges (91, 92) are mechanically clamped together, the assembly functions as that of a unified turbocharger bearing housing. A laminated rotor 12 is mechanically mounted to the shaft 11 of the turbocharger such that it rotates about the axis 1 of the turbocharger with the shaft and wheels, becoming part of the rotating assembly of the turbocharger. A laminated stator 40, with power windings 42 providing the magnetic force to drive the aforementioned rotor 12, is mounted concentric with the rotor.

The surface finish and accuracy of the shaft surfaces, upon which the internal oil film for the journal bearings is generated, may have for example a surface finish of Rz4 coupled with a cylindricity requirement of 0.005 mm. The surface finish of the surfaces (24, 25), which support the journal bearings (49C, 49T) respectively, are sufficiently fine that they could not tolerate scratches or grooves generated by pressing the rotor 12 over these surfaces. To prevent damage to the journal bearing surfaces when the collars and rotor stack are assembled to the shaft 11, the diameters of the various portions of the shaft are stepped down towards the compressor-end of the shaft, which is the end of the shaft over which parts are assembled onto the shaft.

As depicted in FIG. 2, a ring boss 15 locates the piston ring 5 that provides a seal between the exhaust gases in the turbine stage and the oil and air within the bearing housing. The turbine-end journal bearing 49T is disposed about journal 25. The turbine-end electric motor collar 13T is secured to (i.e. pressed onto) diameter 26. Journal 25 is bound on one side by shoulder A, which is located between the ring boss 15 and journal 25. At the other end, journal 25 is defined by step B, which is located between journal 25 and diameter 26. Each transition to a different diameter along the shaft is referred to as a step. Each step is associated with a shoulder against which components may be located.

Rotor 12 is secured to the shaft along diameter 27. Step C marks the transition between diameter 26 and diameter 27. Compressor-end collar 13C is also secured to diameter 27. Compressor-end journal bearing 49C is disposed about journal 24. The transition between diameter 27 and journal 24 is marked by step D. Step S marks the transition between journal 24 and the stub shaft 16. The axial constraint, in the direction of the electric motor rotor, is provided by the clamping load of the compressor nut 17 on the compressor wheel 20, flinger 53, and thrust washer 52, against shoulder S.

While the above described multiple diameters provide assembly protection for the very accurate and fine surface finishes of the various portions of the shaft, the inside diameters of the compressor-end journal bearing 49C and motor collar 13C are smaller (and hence different) from those parts (49T, 13T) on the turbine side of the electric motor rotor 12. This difference means that the part number count per turbocharger increases and the potential for incorrect assembly of the journal bearings and motor collars exists. It also means that the journal bearings can run at different speeds since the speed defining features (inside diameter, ratio of inside diameter to outside diameter etc.) are different turbine-end to compressor-end. In this case, the compressor-end journal bearing will run at a lower speed than does the turbine-end journal bearing.

Accordingly, there is a need for a bearing system for use in an electrically assisted turbocharger that provides the desired bearing surface finishes while minimizing the complexity and part count associated with existing designs.

SUMMARY

Provided herein is a turbocharger bearing system comprising a shaft including at least one shoulder and a bearing sleeve disposed on the shaft. The bearing sleeve includes a collar with a journal portion extending therefrom. A journal bearing is disposed on the journal portion and the journal portion abuts the shoulder of the shaft. In an embodiment the bearing system comprises two bearing sleeves and a corresponding journal bearing disposed on each bearing sleeve.

In certain aspects of the technology described herein, the bearing sleeves may be oriented in opposite directions. In an embodiment, the shaft is the same diameter where the bearing sleeves are positioned. Accordingly, the bearing sleeves may be interchangeable, as well as the journal bearings. In another aspect of the technology, an electric motor rotor is disposed between the two bearing sleeves, and may be clamped between the two bearing sleeves.

In an embodiment, a turbocharger bearing system comprises a shaft including at least one shoulder with a rotor disposed on the shaft. First and second bearing sleeves are disposed on the shaft at opposite ends of the rotor. Each bearing sleeve includes a collar and a journal portion. A journal bearing is disposed on each journal portion and the journal portion of the first bearing sleeve abuts the shoulder.

Also contemplated herein is a turbocharger incorporating the disclosed bearing system. The turbocharger comprising a compressor wheel and a turbine wheel disposed on opposite ends of a shaft with a housing supporting the shaft. A stator is disposed in the housing and a corresponding rotor is disposed on the shaft. First and second bearing sleeves are disposed on the shaft at opposite ends of the rotor, wherein each bearing sleeve includes a collar and a journal portion extending therefrom. A journal bearing is disposed on each journal portion.

These and other aspects of the bearing system and turbocharger incorporating the same will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

BRIEF DESCRIPTION OF THE DRAWINGS

Non-limiting and non-exhaustive embodiments of the bearing system, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the technology of the application. However, embodiments may be implemented in many different forms and should not be construed as being limited to the embodiments set forth herein. The following detailed description is, therefore, not to be taken in a limiting sense.

While the design for locating and mounting the rotor of an electric motor onto the shaft of a turbocharger, as described above, is technically functional, it causes several problems from a performance, cost, and from a quality perspective. In order to protect the surface finish of sensitive regions of the shaft, multiple diametrical steps are formed along the shaft. These differences in diameter mean that there must be a unique turbine-end journal bearing 13T, a unique compressor-end journal bearing 13C, a unique turbine-end motor collar 13T, and a unique compressor-end motor collar 13C. While not only increasing the part number count by two items for each turbocharger, the potential for assembly error by assembling the turbine-end journal bearing (and/or collar) on the compressor-end, or vice versa, can present a quality problem.

Figure 1:
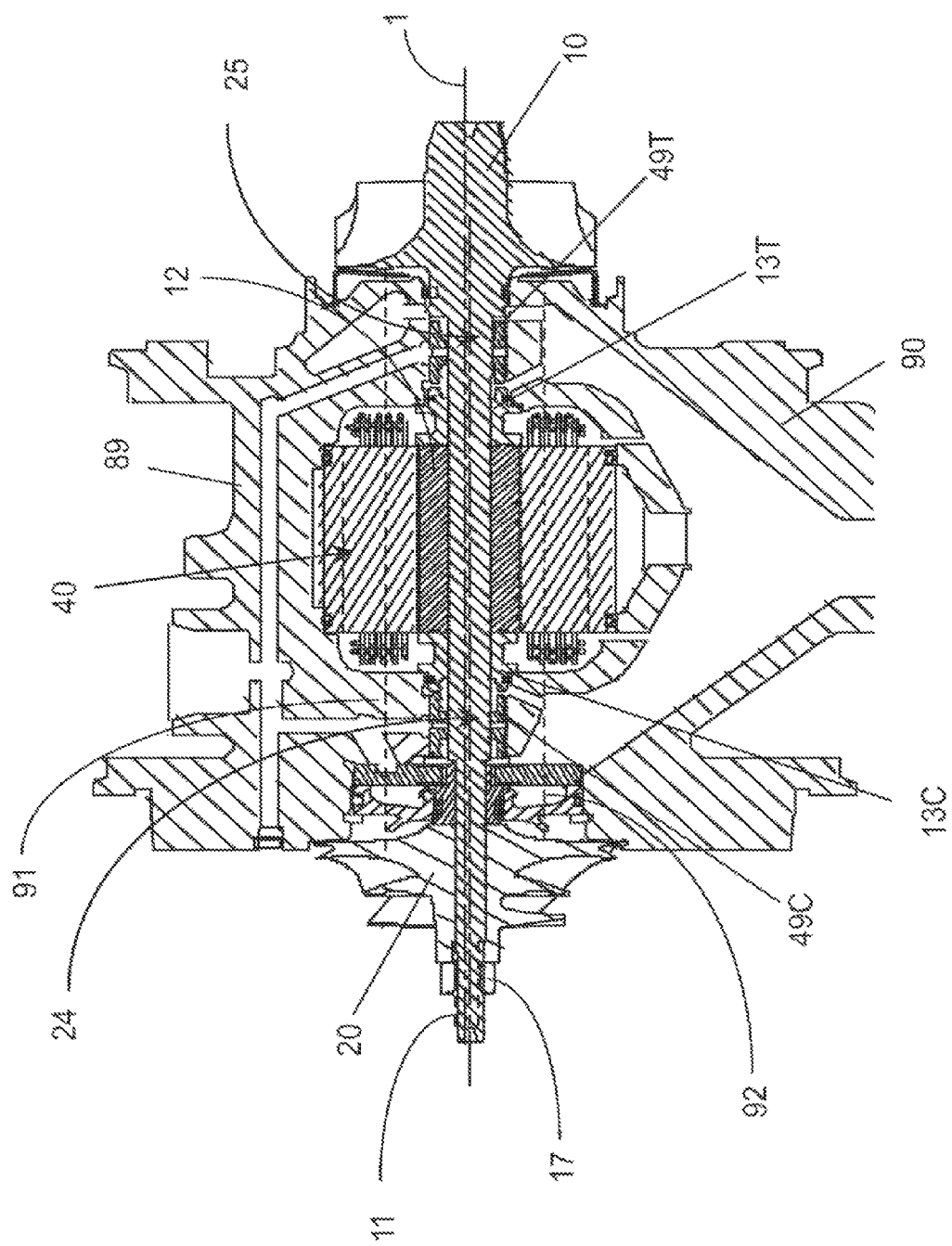
FIG. 1 is a side view in cross-section illustrating a turbocharger with an electric motor disposed between the bearings.
Figure 2:
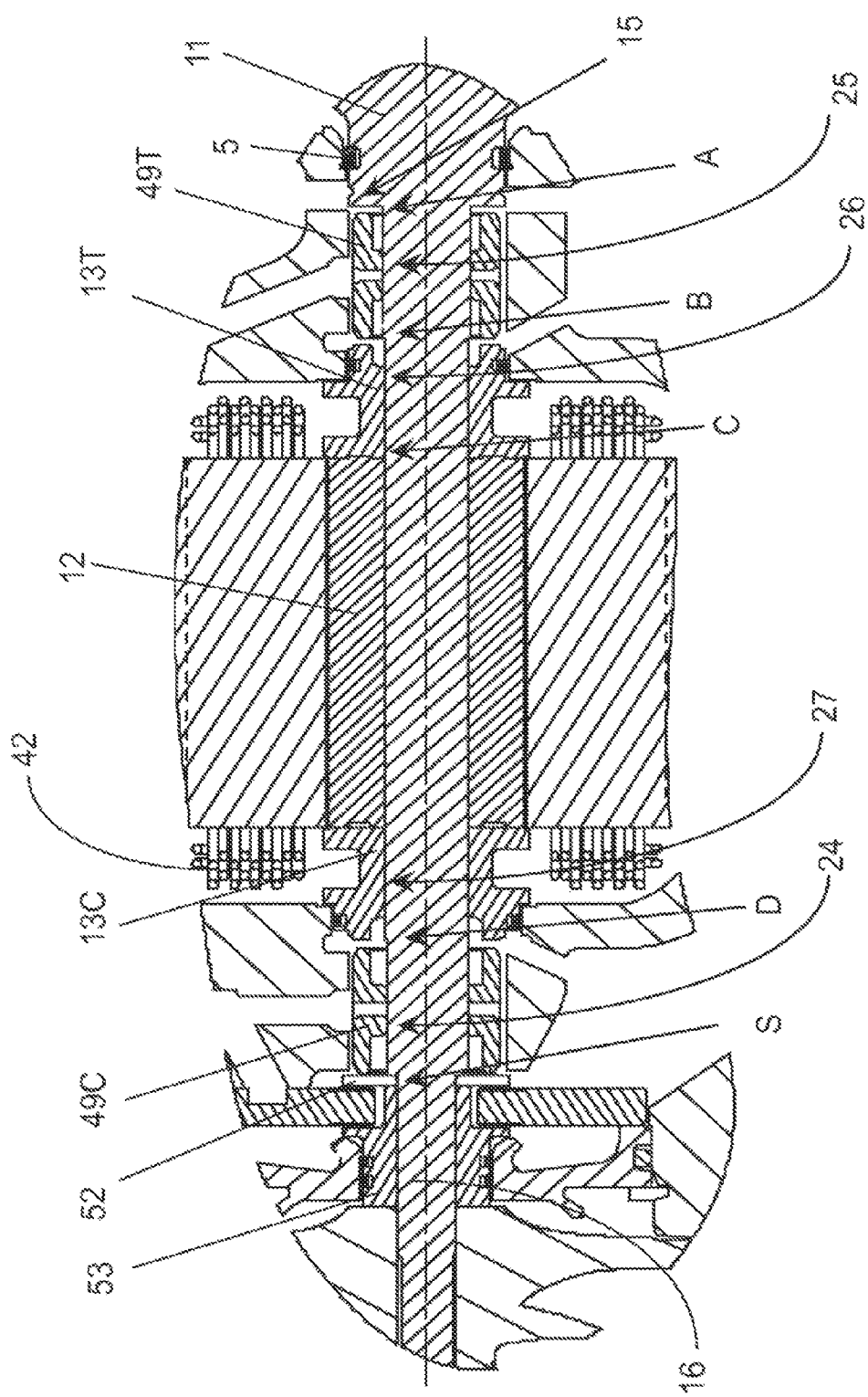
FIG. 2 is an enlarged partial side view in cross-section of the turbocharger shown in FIG. 1.
Figure 3:
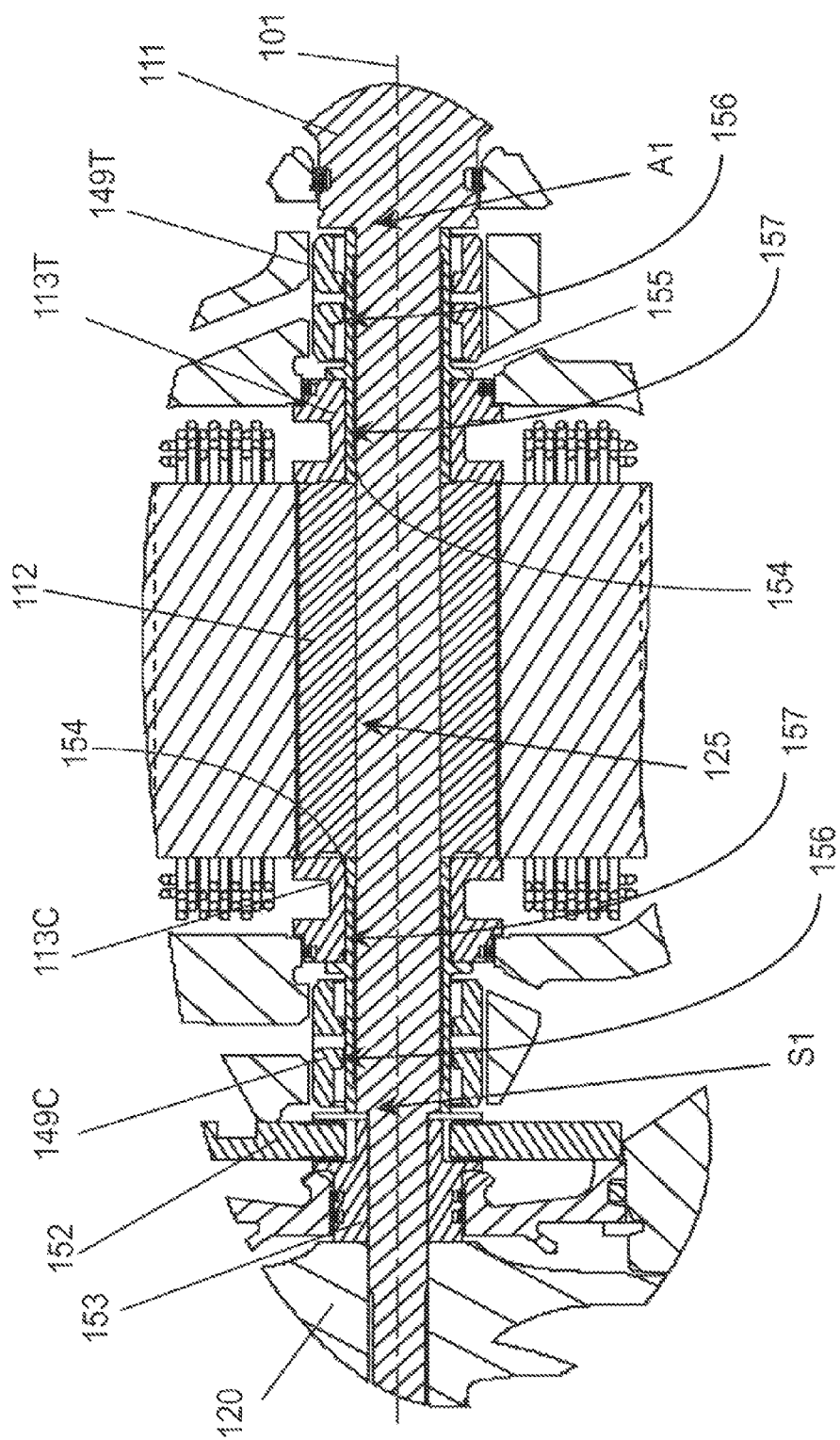
FIG. 3 is an enlarged partial side view in cross-section of a turbocharger bearing system according to a first exemplary embodiment.
Figure 4:
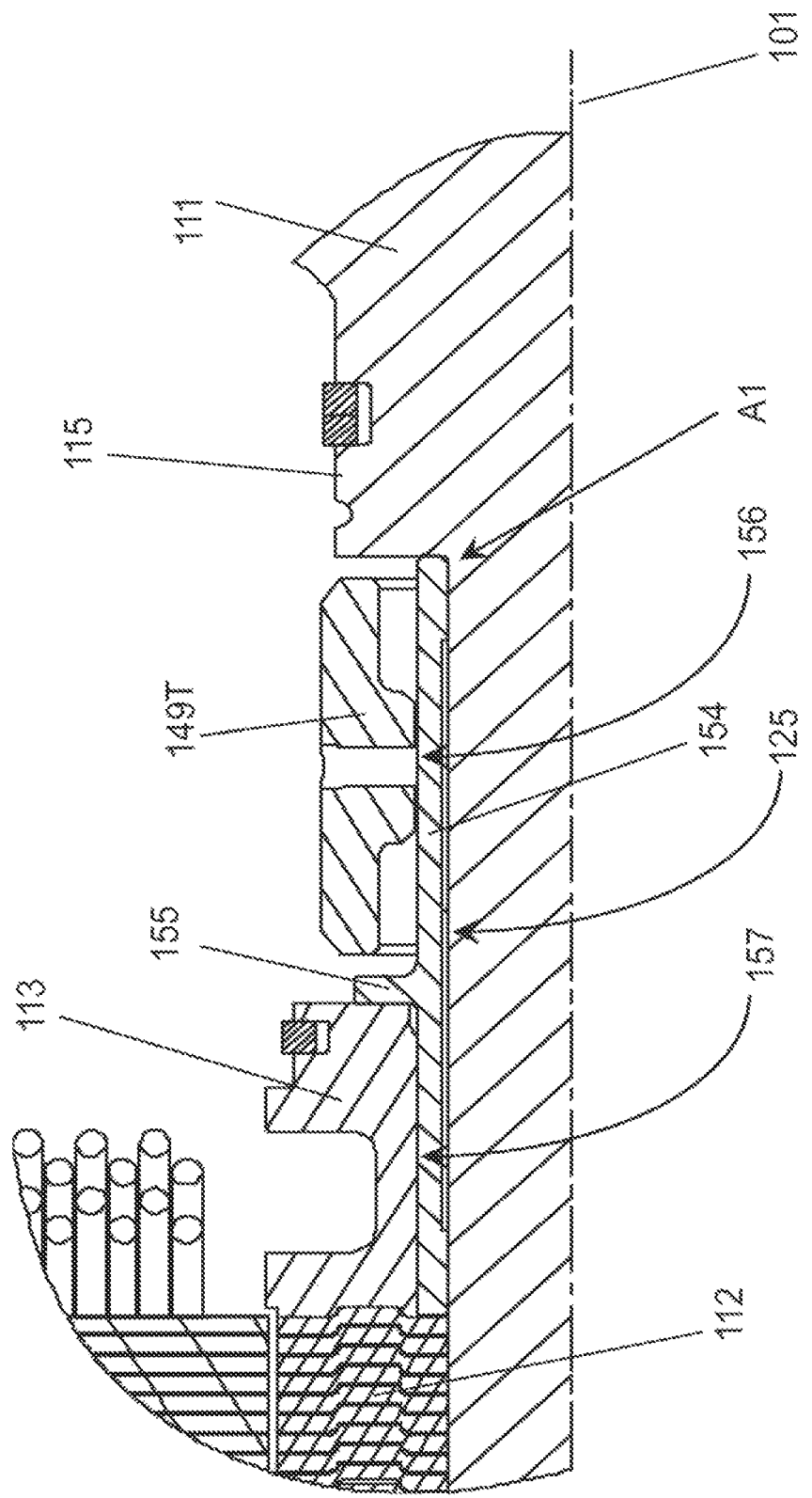
FIG. 4 is an enlarged partial side view in cross-section of the bearing shown in FIG. 3.

Provided herein is a bearing system for use in an electrically assisted turbocharger that provides protection for the bearing surface finishes while minimizing the complexity and part count associated with existing designs. As shown in FIGS. 3 and 4, a bearing system according to a first exemplary embodiment includes sleeves 154. Each sleeve 154 is disposed on shaft 111 on diameter 125, thus the sleeves are coaxial with the centerline axis 101 of the shaft. Each sleeve has two cylindrical surfaces (156, 157) separated by a flange 155.

The sleeves have a surface 156 upon which the journal bearings (149C, 149T) rotate. On the other side of the flange 155, is a surface 157 for radially locating the motor collars (113C, 113T). The flange feature 155 on the outside of the sleeve 154 axially constrains the motor collars (113C, 113T) against rotor 112. On the turbine-end, sleeve 154 is axially constrained by a shoulder A1 located between the ring boss 115 and diameter 125. Thus, the turbine-end of the rotor 112 of the electric motor is axially located relative to the ring boss shoulder A1.

In this embodiment, the sleeve 154 used for the compressor-side of the electric motor rotor 112 is the same as that used for the turbine-side of the electric motor, albeit oriented in the opposite direction. On the compressor-side of the electric motor, the compressor side collar 113C is located closest to the electric motor rotor 112, and the compressor-side journal bearing 149C is axially located on the other side of the flange 155. The axial constraint, in the direction of the electric motor rotor, is provided by the clamping load of the compressor nut (not shown) on the compressor wheel 120, flinger 153, and thrust washer 152, against shoulder S1. This load is transferred through the compressor-end sleeve 154 to the compressor-end collar 113C to clamp the laminations of the rotor 112 of the electric motor against the turbine-end collar 113T, and, as explained above, the turbine-end sleeve is constrained against the shoulder A1 of the ring boss 115. Accordingly, shaft 111 is the same diameter along the length of the shaft that supports the bearing sleeves 154 and rotor 112, thereby simplifying the manufacture of the shaft 111. It should be appreciated that journal bearings 149C and 149T ride on sleeves 154. As such, the shaft surface finishes may be relaxed.

Furthermore, in this embodiment, the journal bearings are interchangeable compressor-end to turbine-end, and the motor collars 113C, 113T may also be similarly interchangeable. Diameter 125 of the shaft may be the same as the diameter of a standard turbocharger of the same size. The clamping load of the force exerted by the compressor nut on the laminations of the rotor not only assists in the radial alignment of the lamination pack, but also forces the rotor to rotate at the same speed as the shaft (i.e. there is no relative rotational motion between the rotor and the shaft). The sleeves may be comprised of hardened steel and the bearings are comprised of bronze type bearing material, as is known in the art.

Figure 5:
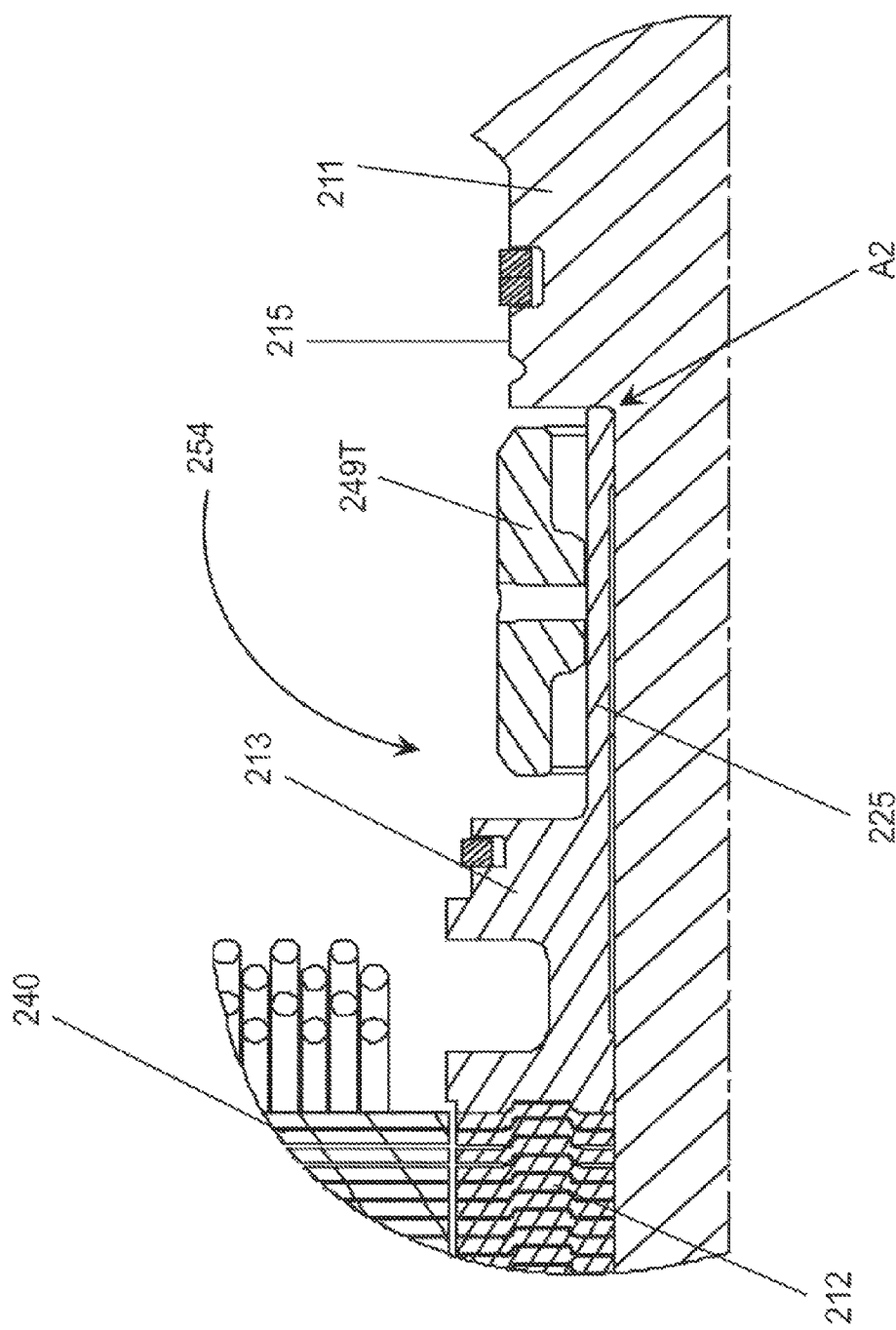
FIG. 5 is an enlarged partial side view in cross-section of a turbocharger bearing system according to a second exemplary embodiment.

In a second exemplary embodiment, as depicted in FIG. 5, bearing sleeve 254 incorporates a motor collar 213, thereby further reducing the number of parts in the assembly. The axial position of the collar (and hence the laminations of the rotor 212) is determined by journal portion 225 that extends from the motor collar 213. The rotor 212 is positioned within stator 240. Journal portion 225 locates the motor collar 213 by butting against the shoulder A2 of the ring boss 215. The compressive load on the laminations of the rotor 212 is provided in the same manner as that of the first embodiment by the load exerted by the compressor nut (not shown). In this case, the journal bearings 249T (249C not shown) are identical, and the bearing sleeves are identical, albeit oriented in opposite directions. Accordingly, the shaft 211 is the same diameter where the bearing sleeves 254 are positioned.

Figure 6:
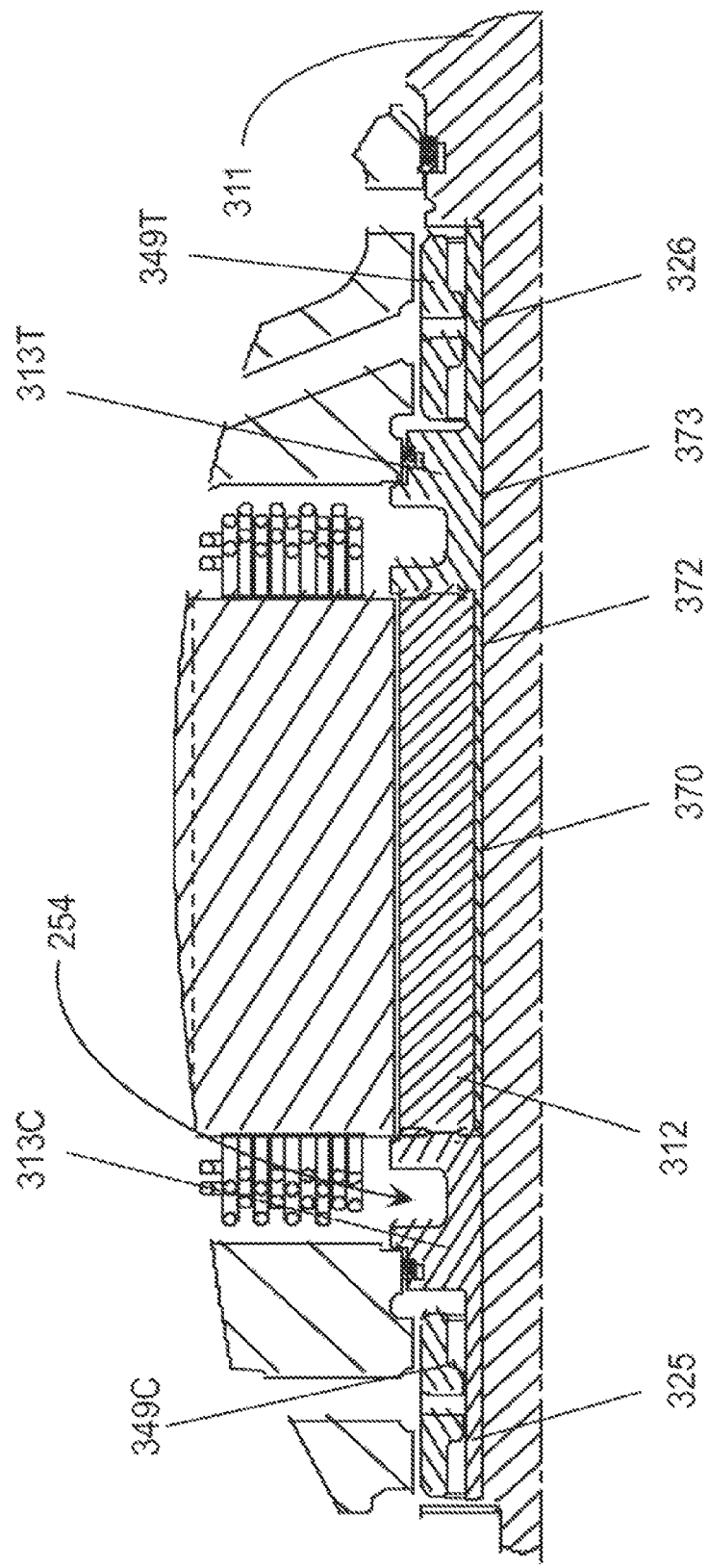
FIG. 6 is an enlarged partial side view in cross-section of a turbocharger bearing system according to a third exemplary embodiment.

In a third exemplary embodiment, as depicted in FIG. 6, the laminations of the rotor 312 have an inside diameter larger than the diameter of shaft 311. A cylindrical sleeve 370 is positioned between the rotor 312 and shaft 311. The cylindrical sleeve 370 may be integrated with one of the collars, such as collar 313T as shown or with collar 313C. Alternatively the sleeve could stand alone as a separate piece to the two collars 313T, 313T. In this case, cylindrical sleeve 370 includes a collar portion 313T and a rotor sleeve portion 372 extending axially therefrom. A journal portion 326 extends axially from the collar portion 313T opposite the rotor sleeve portion 372. With this variation, the laminations of the rotor 312 of the electric motor can be delivered to the turbocharger assembly site, and the assembly of the rotor assembly to the shaft 311 is simplified. The closer the fit of the inside diameter of the lamination to the outside surface of the shaft, the better the initial balance, due the rotor lamination pack, of the rotating assembly. But contrary to this potential gain, the tighter the clearance between the rotor laminations and the surface of the shaft, the greater the propensity for the laminations to cock and resist assembly force. By incorporating sleeve 370 to deal with the tighter lamination inside diameter the final assembly is made more straightforward. By incorporating a collar and a sleeve into one piece, the laminations can be compressed against the collar 313T and therefore will be more stable at the turbocharger assembly step. The unitary collar and sleeve 370 could be either on the compressor-end or the turbine-end of the motor. In this variation, the clamping load of the compressor nut on the collars and the sleeve prevents rotation of the sleeve and laminations, relative to the shaft. This embodiment also incorporates a bearing sleeve 354 similar to that described above with respect to the second exemplary embodiment. Sleeve 354 includes a journal portion 325. Accordingly, journal bearings 349C and 349T ride on journal portions 325 and 326 respectively. It should be noted that cylindrical sleeve 370 and bearing sleeve 354 have the same inside diameter. Therefore, shaft 311 has the same diameter 373 between steps A3 and S3.

Figure 7:
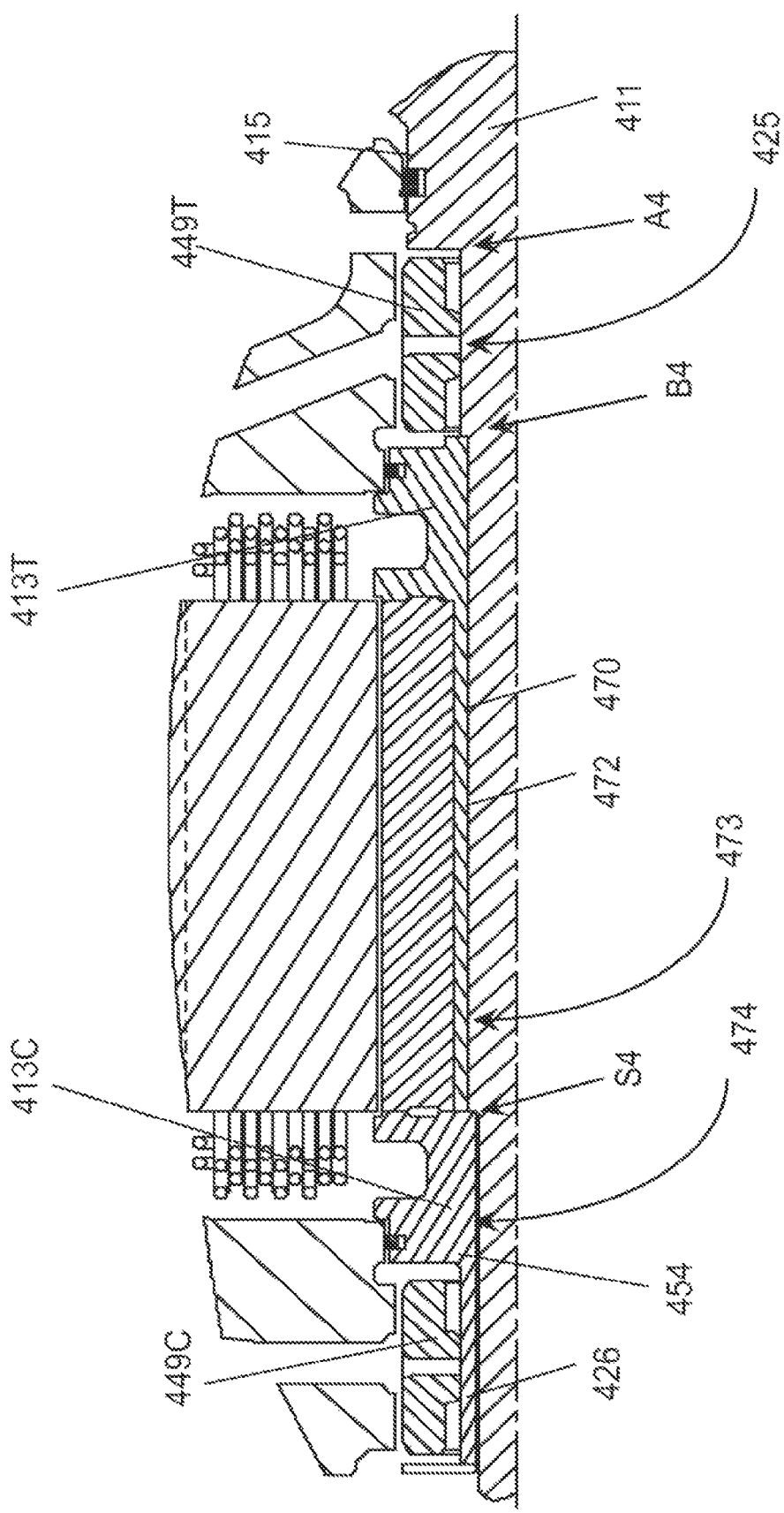
FIG. 7 is an enlarged partial side view in cross-section of a turbocharger bearing system according to a fourth exemplary embodiment.

In a fourth exemplary embodiment, as depicted in FIG. 7, dimensions and features of both journal bearings (449C, 449T) are the same as those of the standard turbocharger. The step A4 transitioning from the piston ring boss 415 to journal 425 is similar to a standard turbocharger. Journal 425, about which the turbine-end journal bearing 449T is supported, is stepped down at B4 to a smaller diameter 473. Cylindrical sleeve 470 includes a motor collar portion 413T with a rotor sleeve portion 472 extending therefrom. Cylindrical sleeve 470 does not include a bearing sleeve as in the previous embodiment. Therefore, journal bearing 449T is disposed on diameter 425 rather than a journal sleeve. Shaft 411 transitions to diameter 474 at step S4. Bearing sleeve 454 is disposed on diameter 474. Bearing sleeve 454 includes a motor collar portion 413C with a bearing sleeve portion 426 extending therefrom. The diameter of bearing sleeve portion 426 is the same as that of journal 425, thereby allowing the same journal bearing to be used in both locations.

Figure 8:
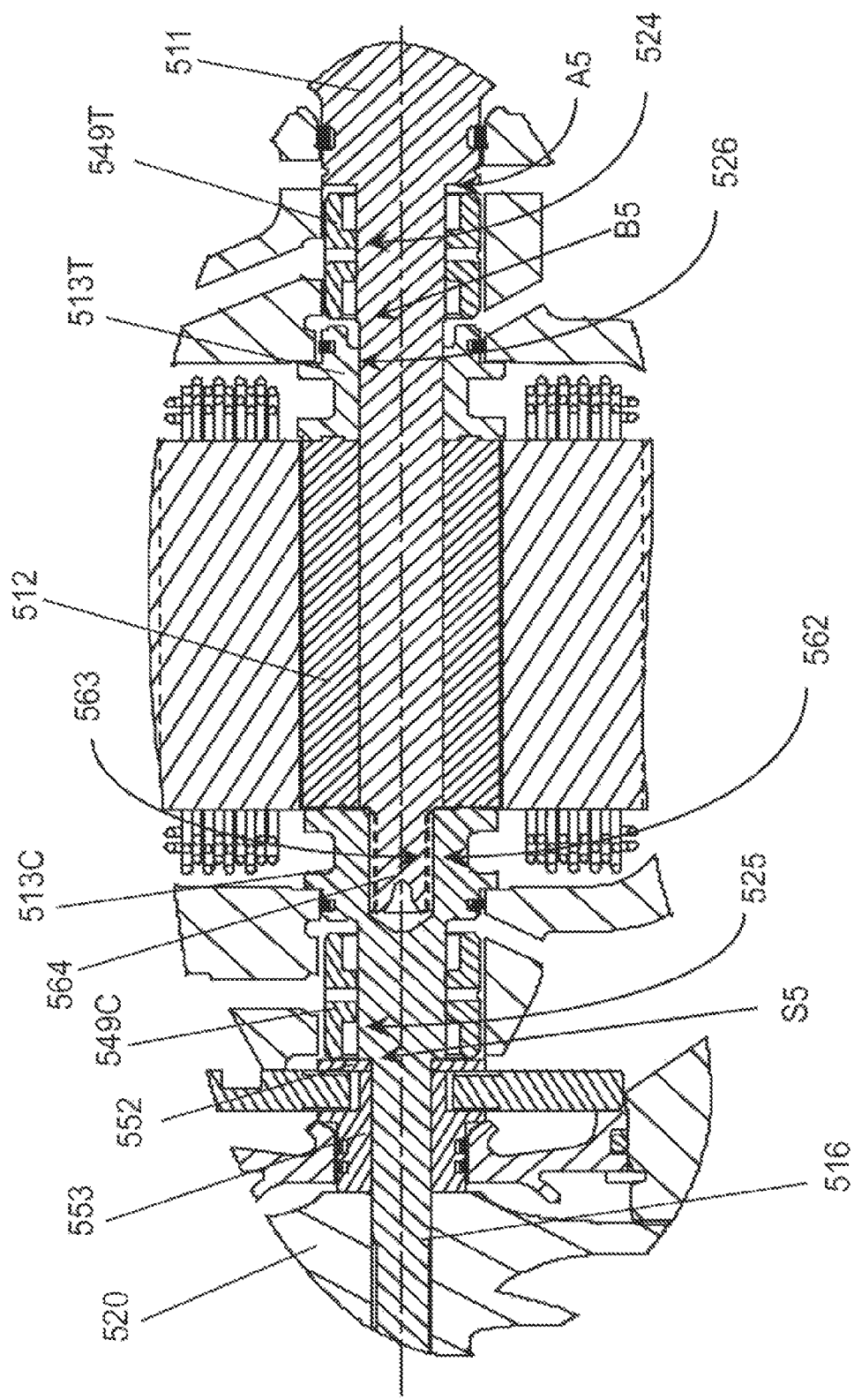
FIG. 8 is an enlarged partial side view in cross-section of a turbocharger bearing system according to a fifth exemplary embodiment.

In a fifth exemplary embodiment, as depicted in FIG. 8, shaft 511 is sized to extend through the rotor 512 and includes a protruding threaded stub 564. A threaded extension shaft 516 is screwed onto the stub 564. Extension shaft 516 includes a motor collar portion 513C and a journal portion 525 for supporting journal bearing 549C. Extension shaft 516 also includes female threads 562 that mate with male threads 563 disposed on stub 564. Shaft 511 transitions to journal 524 at step A5. Journal 524 transitions to diameter 526 at step B5. Journal bearing 549T is disposed on journal 524 and motor collar 513T is secured to diameter 526. Rotor 512 is also disposed on diameter 526 and is clamped between collar 513T and collar portion 513C. In this embodiment, the clamp load of the compressor wheel 520, flinger 553, and thrust washer 552 is applied by a typical compressor nut (not shown) against the abutment of the typical stub shaft step S5. The clamp load, compressing the laminations pack of the rotor 512, is generated by the threading of the extension shaft 516 down the stub 564 of shaft 511.

Figure 9:
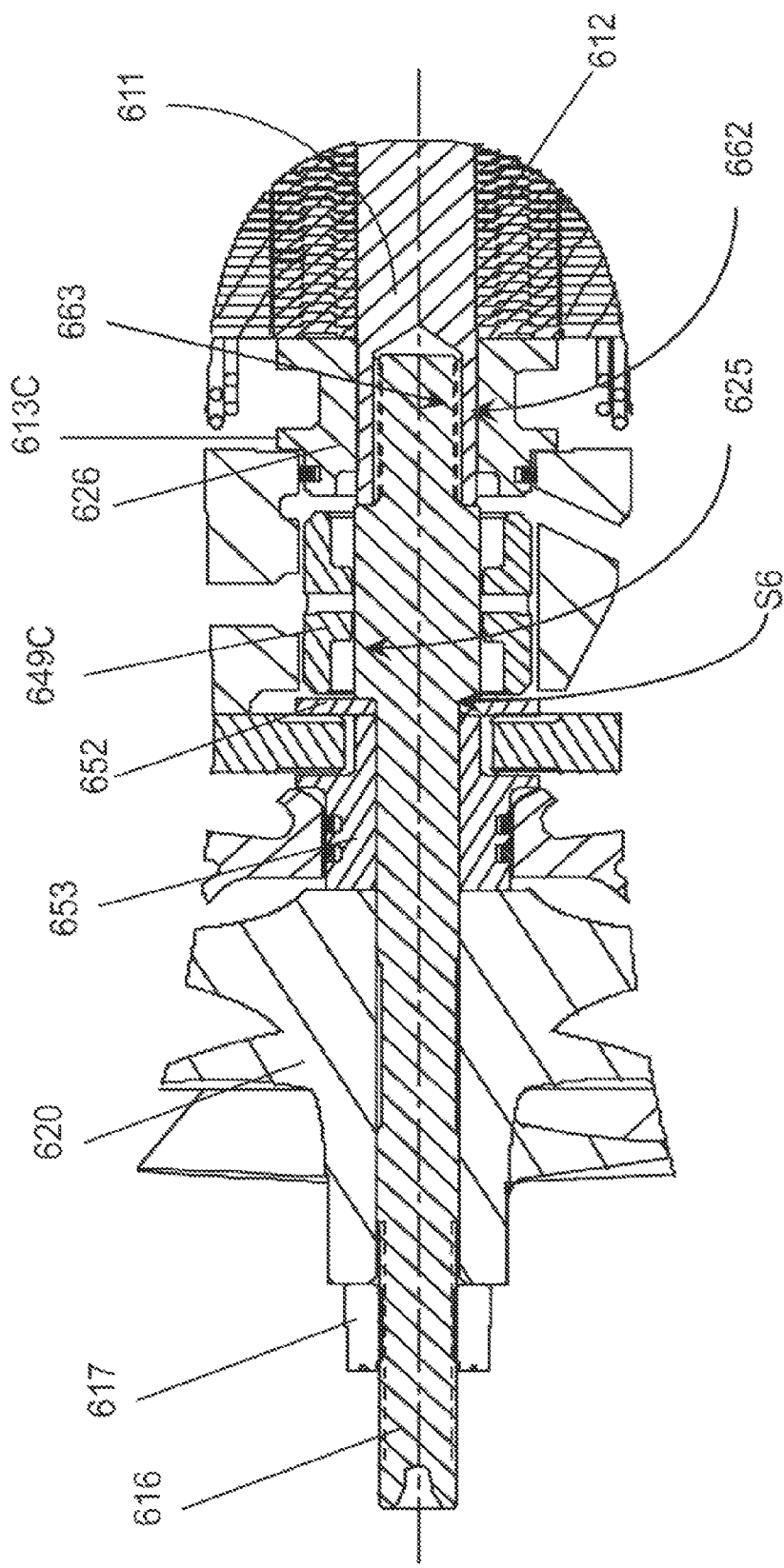
FIG. 9 is an enlarged partial side view in cross-section of a turbocharger bearing system according to a sixth exemplary embodiment.

In a sixth exemplary embodiment, as depicted in FIG. 9, shaft 611 extends just past the rotor 612 and the motor collar 613C is pressed onto shaft 611 to provide the compressive force, keeping the laminations of the rotor, clamped against the turbine-end collar (not shown). Shaft 611 includes female threads 663 that mate with male threads 662 disposed on extension shaft 616. Extension shaft 616 includes a journal 625 that supports journal bearing 649C. Compressor nut 617 exerts a clamping load on the compressor wheel 620, flinger 653, and thrust washer 652, against the shoulder of the step S6 located adjacent journal 625.

Accordingly, the bearing system has been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A turbocharger bearing system, comprising:
    a shaft (211) including at least one shoulder (A2);
    a bearing sleeve (254) disposed on the shaft (211) and including a collar (213) and a journal portion (225) extending therefrom;
    a journal bearing (249) disposed on the journal portion (225); and
    wherein the journal portion (225) abuts the shoulder (A2).

2. The turbocharger bearing system according to claim 1, comprising two bearing sleeves (254) and a corresponding journal bearing (249) disposed on each bearing sleeve (254).

3. The turbocharger bearing system according to claim 2, wherein the bearing sleeves (254) are oriented in opposite directions.

4. The turbocharger bearing system according to claim 2, wherein the shaft (211) is the same diameter where the bearing sleeves (254) are positioned.

5. The turbocharger bearing system according to claim 2, wherein the journal bearings (249) are interchangeable.

6. The turbocharger bearing system according to claim 2, wherein the bearing sleeves (254) are interchangeable.

7. A turbocharger bearing system, comprising:
- a shaft (211) including at least one shoulder (A2);
- a rotor (212) disposed on the shaft (211);
- first and second bearing sleeves (254) disposed on the shaft (211) at opposite ends of the rotor (212), wherein each bearing sleeve (254) includes a collar (213) and a journal portion (225) extending therefrom;
- a journal bearing (249) disposed on each journal portion (225); and
- wherein the journal portion (225) of the first bearing sleeve (254) abuts the shoulder (A2).

8. The turbocharger bearing system according to claim 7, wherein the journal bearings (249) are interchangeable.

9. The turbocharger bearing system according to claim 8, wherein the bearing sleeves (254) are interchangeable.

10. The turbocharger bearing system according to claim 7, wherein the rotor (212) is clamped between the first and second bearing sleeves (254).

11. A turbocharger, comprising:
- a compressor wheel (20) and a turbine wheel (10) disposed on opposite ends of a shaft (211);
- a housing (89, 90) supporting the shaft (211);
- a stator (240) disposed in the housing (89, 90);
- a rotor (212) disposed on the shaft (211);
- first and second bearing sleeves (254) disposed on the shaft (211) at opposite ends of the rotor (212), wherein each bearing sleeve (254) includes a collar (213) and a journal portion (225) extending therefrom; and
- a journal bearing (249) disposed on each journal portion (225).

12. The turbocharger according to claim 11, wherein the first and second bearing sleeves (254) are oriented in opposite directions.

13. The turbocharger according to claim 12, wherein the rotor (212) is clamped between the two bearing sleeves (254).

14. The turbocharger according to claim 11, wherein the shaft (211) is the same diameter where the first and second bearing sleeves (254) are positioned.

15. The turbocharger according to claim 11, wherein the journal bearings (249) are interchangeable.

* * * * *